United States Patent
West et al.

(10) Patent No.: US 11,148,367 B2
(45) Date of Patent: Oct. 19, 2021

(54) THREE-DIMENSIONAL PRINTING

(71) Applicant: HEWLETT-PACKARD DEVELOPMENT COMPANY, L.P., Houston, TX (US)

(72) Inventors: Randall Dean West, Vancouver, WA (US); Matt G Driggers, Vancouver, WA (US); Brent Ewald, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 636 days.

(21) Appl. No.: 16/074,327

(22) PCT Filed: Aug. 31, 2016

(86) PCT No.: PCT/US2016/049741
§ 371 (c)(1),
(2) Date: Jul. 31, 2018

(87) PCT Pub. No.: WO2018/044301
PCT Pub. Date: Mar. 8, 2018

(65) Prior Publication Data
US 2021/0187853 A1     Jun. 24, 2021

(51) Int. Cl.
*B29C 64/329*     (2017.01)
*B33Y 30/00*     (2015.01)
(Continued)

(52) U.S. Cl.
CPC .......... *B29C 64/329* (2017.08); *B29C 64/245* (2017.08); *B29C 64/357* (2017.08);
(Continued)

(58) Field of Classification Search
CPC ... B29C 64/329; B29C 64/357; B29C 64/245; B29C 64/393; B29C 64/153;
(Continued)

(56) References Cited

U.S. PATENT DOCUMENTS 6,336,480 B2   1/2002  Gaylo et al.
6,672,343 B1   1/2004  Perret et al.
(Continued)

FOREIGN PATENT DOCUMENTS

JP   2003502500   1/2003
JP   2008540100   11/2008
JP   2009279928   12/2009

OTHER PUBLICATIONS

"Voxeljet Introduces First Continuous 3D Printing Machine", www.3ders.org—3D printer and 3D printing news, Retrieved from Internet: < http://www.3ders.org/articles/20120412-voxeljet-introduces-first-continuous-3d-printing-machine.html >, Apr. 12, 2012, 9 pp.

*Primary Examiner* — Joseph S Del Sole
*Assistant Examiner* — Lawrence D. Hohenbrink, Jr.
(74) *Attorney, Agent, or Firm* — HP Inc. Patent Department

(57) ABSTRACT

According to one example, there is provided a method of distributing build material in a 3D printing system. The method comprises moving a build material support positioned below a hopper, the movement to cause build material stored in the hopper to be deposited on the build material support, and moving a recoater to spread build material from the build material support over a build platform to form a layer of build material thereon, and to return any excess build material back to the build material support.

13 Claims, 4 Drawing Sheets

(51) Int. Cl.
  *B33Y 10/00* (2015.01)
  *B29C 64/245* (2017.01)
  *B29C 64/357* (2017.01)
  *B29C 64/393* (2017.01)
  *B33Y 50/02* (2015.01)
  *B33Y 40/00* (2020.01)

(52) U.S. Cl.
  CPC ............ *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
  CPC ....... B29C 64/343; B33Y 10/00; B33Y 30/00; B33Y 40/00; B33Y 50/02
  USPC .................................. 425/162, 375; 264/308
  See application file for complete search history.

(56) References Cited

U.S. PATENT DOCUMENTS

| | | |
|---|---|---|
| 7,291,002 B2 | 11/2007 | Russell et al. |
| 8,017,055 B2 | 9/2011 | Davidson et al. |
| 8,568,124 B2 | 10/2013 | Brunermer |
| 8,888,480 B2 | 11/2014 | Yoo et al. |
| 2008/0006334 A1 | 1/2008 | Davidson et al. |
| 2008/0241404 A1 | 10/2008 | Allaman et al. |
| 2011/0109016 A1* | 5/2011 | Fuwa .................. B22F 10/20 264/460 |
| 2014/0314964 A1 | 10/2014 | Ackelid |
| 2015/0306819 A1 | 10/2015 | Ljungblad |

* cited by examiner

THREE-DIMENSIONAL PRINTING

BACKGROUND

Additive manufacturing, more commonly known as three-dimensional or 3D printing, enables objects to be generated on a layer-by-layer basis. 3D printing techniques may generate layers of an object by forming successive layers of a build material on a build platform, and selectively solidifying portions of each layer of the build material.

BRIEF DESCRIPTION

Examples will now be described, by way of non-limiting example only, with reference to the accompanying drawings, in which.

DETAILED DESCRIPTION

In powder-based 3D printing systems a layer of powdered build material is formed on a build platform and a selective solidification technique is used to selective solidify portions of the formed layer to form a layer of a 3D object being printed. Various selective solidification techniques exist that include use of fusing agent and fusing energy, use of a laser (e.g. laser sintering), and others.

Figure 1:
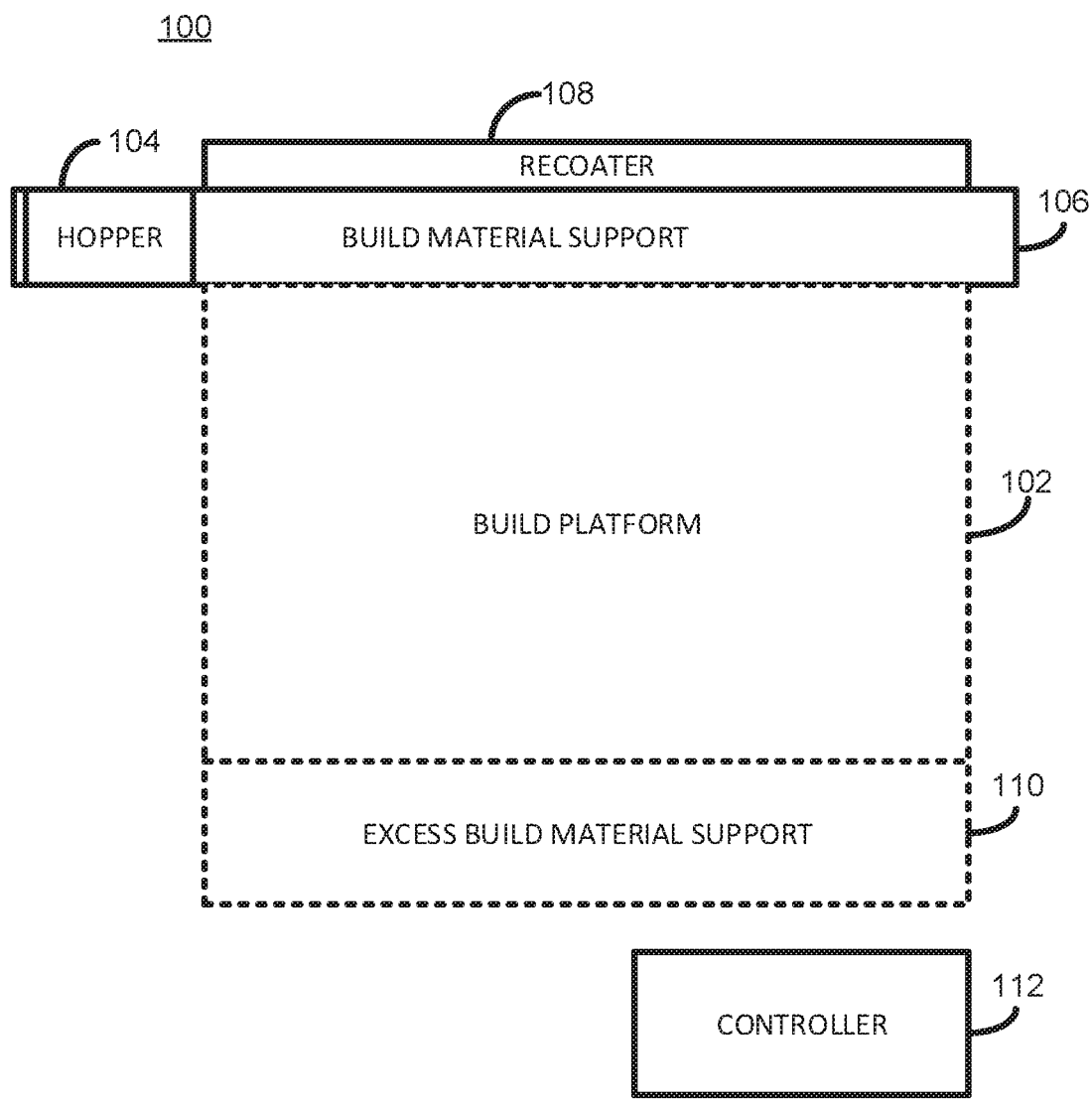
FIG. 1 is a block diagram of a build material distribution system according to one example.

Referring now to FIG. 1 there is shown a block diagram of a build material distribution system 100 according to one example. The build material distribution system 100 is to form a thin layer of a powdered build material on a build platform 102. In one example each layer may be in the region of about 10 to 100 microns thick, although in other examples thinner or thicker layers may be formed. The build platform 102 is movable vertically so that as each formed layer of build material is selectively solidified it may be lowered by a distance corresponding to the build material layer thickness to enable a further layer of build material to be formed thereon. In one example the build platform 102 and excess build material support 110 form an integral part of a 3D printer of which the build material distribution system 100 is a part. In another example, however, the build platform 102 and excess build material support 110 may be part of a removably insertable 3D printing build module that may only be present in the 3D printer during a 3D printing operation. In a further example, however, the excess build material support 110 may form part of a 3D printer and the build platform 102 may form part of a 3D printing build module only present in the 3D printer during a 3D printing operation. In FIG. 1 the build platform 102 and the excess build material support 110 are shown in dotted lines.

The build material distribution system 100 comprises a build material distributor 104. In the present example the build material distributor 104 is in the form of a hopper, as will be described in greater detail below. The hopper 104 is positioned vertically above a build material support 106.

In one example the build material support 106 is in the form of a continuous belt, although in other examples could be a sliding rigid platen.

The build material support 106 is positioned adjacent to the build platform. In one example the build material support 106 is positioned such that it may touch the edge of the build platform 102, such that no gaps exist between the edge of the build material support closest to the build platform and the corresponding edge of the build platform 102. This is to allow the efficient transfer of build material from the build material support 106 to the build platform 102 and to minimize the amount of build material that falls between the build material support 106 and the build platform 102. In some examples suitable sealing mechanisms, such as rubber, silicone, or other low-friction sealing arrangements may be used.

The build material support 106 is controllable to move bi-directionally, under control of a controller 112. The build material support 106 may be movable through any suitable mechanism (not shown), for example, if the build material support 106 is a continuous belt the belt may be mounted on a pair of internal support rollers at least one of which is powered either directly or indirectly by a motor. If the build material support 106 is in the form of a rigid platen, the platen may be moved using a rack-and-pinion type mechanism, or any other suitable mechanism.

The hopper 104 is designed to enable a quantity of build material to be deposited on the build material support 106 by moving the build material support 106 in a first direction away from the hopper 104. This enables, for example, a quantity of build material, in the form of a band, to be deposited on the build material support 104 such that the length of the band of build material on the build material support is suitable for forming a desired layer of build material on the build platform 102. The hopper 104 is also designed to enable any build material on the build material support 106 to be returned to the hopper by moving the build material support 106 in a second direction opposite the first direction.

Figure 2A:
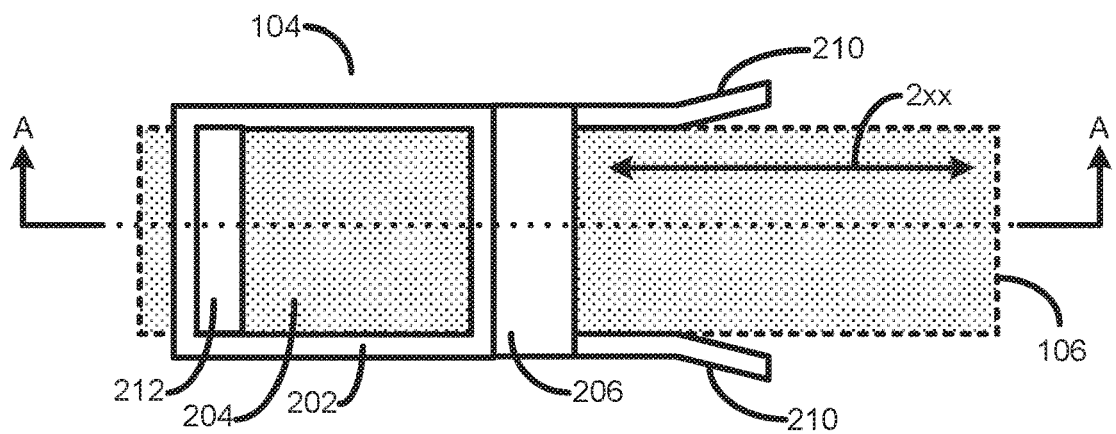
FIG. 2a is a simplified plan view of a hopper according to one example.
Figure 2B:
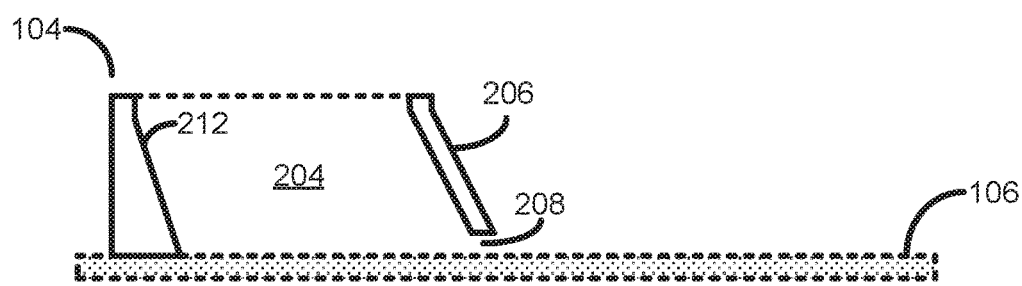
FIG. 2b is a simplified cross-section view of a hopper according to one example.

A more detailed view of a hopper 104 according to one example is shown in FIG. 2a and FIG. 2b.

FIG. 2a is a simplified plan view of the hopper 104 positioned above the build material support 106. FIG. 2b is a simplified cross-section view of the hopper 104 viewed through the plane A-A The hopper 104 comprises a general housing 202. The housing 202 defines an open inner volume 204 in which build material, such as powdered build material may be stored. The housing 202 defines a sloped front wall 206 that defines a port 208 between the base of the front wall 206 and the upper surface of the build material support 106. The shape and dimensions of the port 208 may be chosen based, for example, on characteristics of the build material that is to be stored in the hopper. Build material characteristics may include one or more of: build material angle of repose; build material average grain size; and build material flow characteristics. The housing 104 also defines a sloped internal rear wall 212. The sloped internal rear wall enables build material within the volume 204 to slide down under gravity to form a volume of build material supported at its base by the build material support 106. The housing 202 forms a substantial seal with the build material support 106, apart from the portion of the hopper front wall 206 that forms the port 208. The seal may be integral to the design of base of the hopper housing, or may be provided by additional sealing elements, such as silicone seals, or other low-friction sealing materials that do not unduly encumber the movement of the build material support 106.

The amount of build material storable in the inner volume 204 may be enough to allow a large number of layers of build material to be formed on the build platform 102. In one example, the hopper 104 may be dimensioned to allow it hold sufficient build material to enable a whole 3D object to be generated on the build platform 102. In another example, the hopper 104 may be refillable during a 3D printing operation.

The hopper 104 forms, when containing a suitable build material, a so-called choked-flow hopper. A choked-flow hopper is designed such that build material within the hopper exhibits an inherent stability that causes the flow of build material out of the hopper to automatically stop or 'choke' once a sufficient quantity of build material has built up in the region of the hopper port 208. This prevents, for example, the whole contents of the hopper from emptying from the hopper when there is no movement between the hopper 104 and the build material support 106.

Figure 3A:
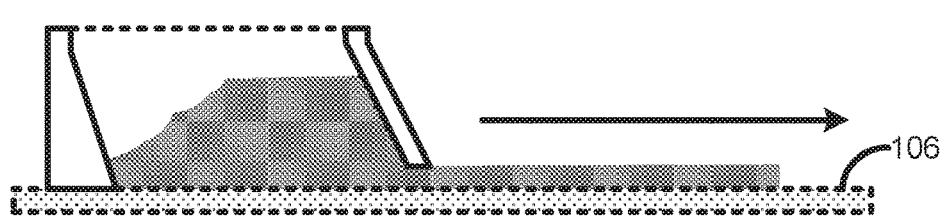
FIG. 3a is a simplified cross-section view of hopper according to one example.
Figure 3B:
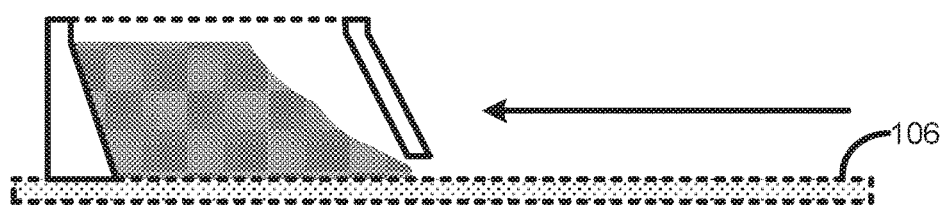
FIG. 3b is a simplified cross-section view of a hopper according to one example.

Build material from the hopper 104 may be deposited on the build material support 106 by moving the build material support 106 away from the hopper 104, as illustrated in FIG. 3*a*. Build material may be returned to the hopper 104 from the build material support 106 by moving the upper surface of the build material support 106 towards the hopper, as illustrated in FIG. 3*b*. To assist in the return of build material to the hopper 104 a pair of shaped build material guides 210 are provided on each side of the hopper 104, as shown in FIG. 2*a*, It should be noted that the shape of the build material shown in FIGS. 3*a* and 3*b* are merely illustrative, and may not represent the actual shape of the build material within the hopper.

The quantity of build material deposited on the build material support 106, and the shape of the band of deposited build material is determined by the dimensions and the shape of the port 208. For example, the height of the band of deposited build material is determined by the height of the port 208, and the width of the band of deposited build material is determined by the width of the port 208. In the example shown the port 208 has a rectangular form, although in other examples any suitable form of port could be used. Other possible forms may include, for example, triangular forms, curved forms, etc. Different forms of port may generate bands of build material having a corresponding shape.

The build material deposited on the build material support 106 may be spread over the build platform 102 by a recoater 108 to form a layer of build material on the build platform 102. Any suitable recoater mechanism may be used such as, for example, a roller or a wiper. The recoater 108 may be mounted, for example, on a motorized or driven carriage (not shown). In one example the recoater 108 is movable in an axis orthogonal to the axis of movement of the build material support 106.

Any excess build material remaining after the passage of the recoater 108 over the build platform 102 may be left on an excess build material support 110 positioned adjacent to the distal edge (in the direction of movement of the recoater) of the build platform 102. In one example, the recoater 108 may pass over any left build material to enable any excess build material to be re-spread over the build platform and allowing any remaining excess build material to be moved back on to the build material support 106. In one example, the recoater 108 may pass over any left build material by hopping, or being raised, over the build material. In another example the excess build material support 110 may be lowered to enable the recoater to be moved passed any build material left thereon.

Any excess build material returned to the build material support 106 may be returned to the hopper 104 by moving the build material support in the reverse direction by a suitable distance.

Figure 4:
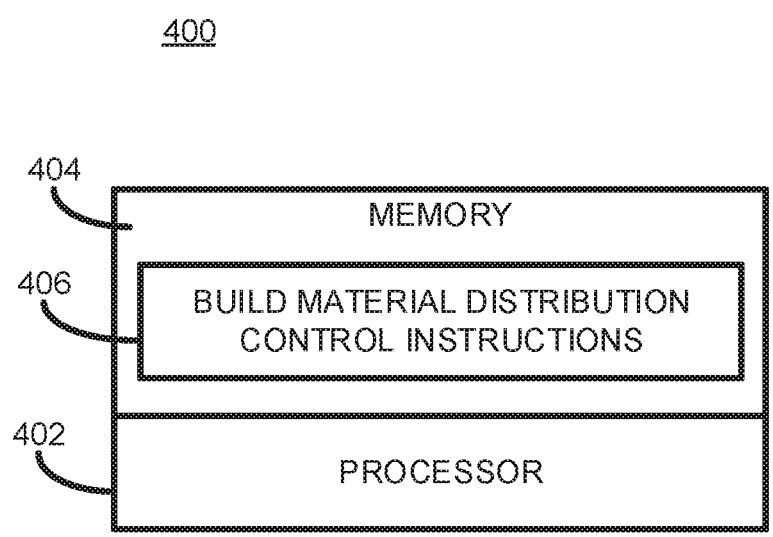
FIG. 4 is a block diagram of a build material distribution controller according to one example.

The general operation of the build material distribution system 100 described above may be controlled, for example, by the controller 112. The controller 112 is shown in greater detail in FIG. 4.

Figure 5:
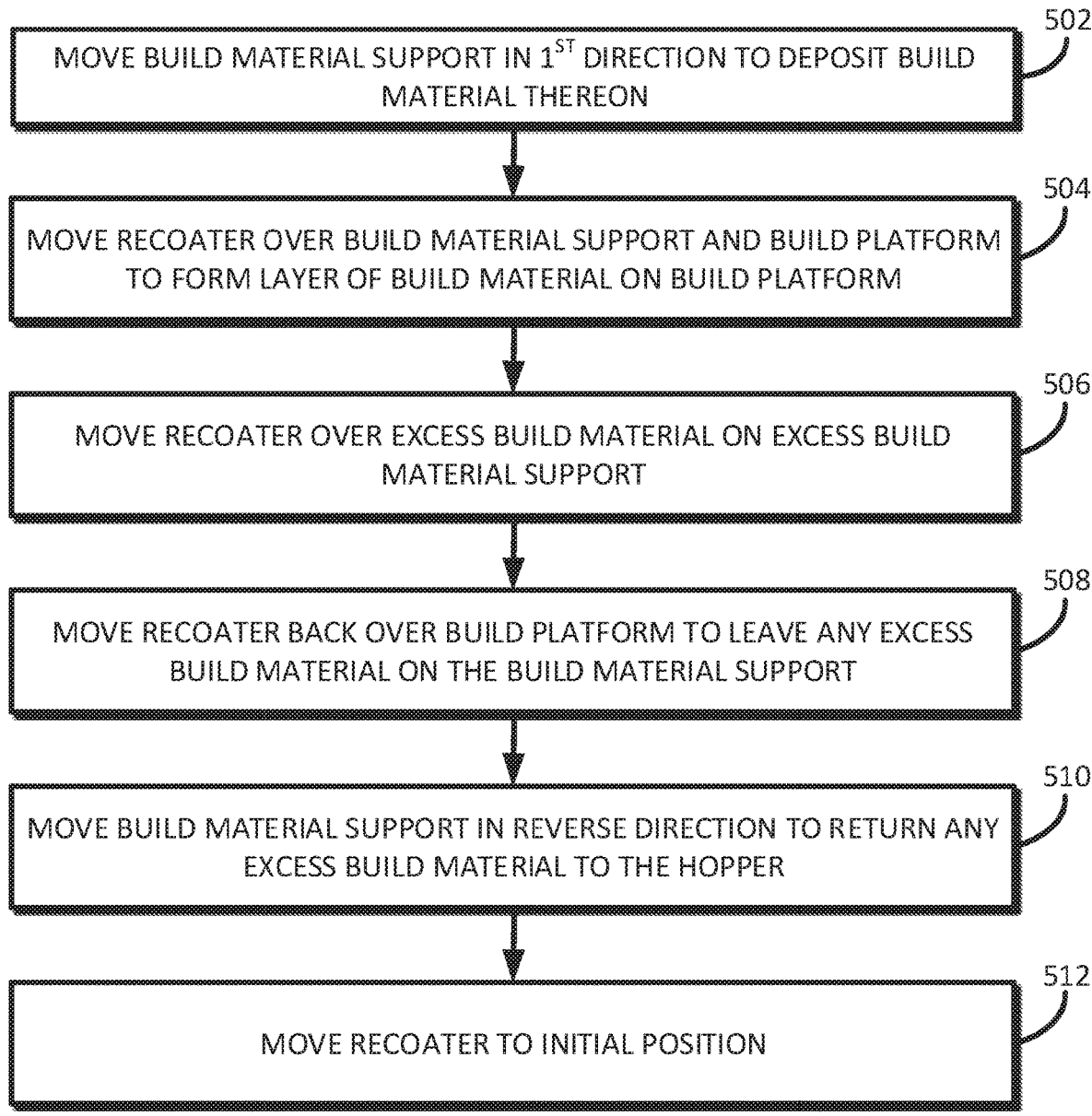
FIG. 5 is a flow diagram outlining a method of operating a build material distribution system according to one example.

The controller 400 comprises a processor 402, such as a microprocessor. The processor 402 is coupled to a memory 404, for example through a suitable communications bus (not shown). The memory 404 stores processor understandable 3D printer control instructions 406 that when executed by the processor 402, cause the controller 400 to control the 3D printer as described herein, Example operation of the system 100 will now be described with additional reference to FIG. 5.

Before operation begins the hopper 104 is loaded with an appropriate quantity of build material, and the recoater 108 is positioned in its initial position as shown in FIG. 1.

At 502, the controller 400 controls the build material support 106 to move in a first direction away from the hopper 104 to cause a band of build material to be deposited thereon, as illustrated in FIG. 3. In one example the controller 400 controls the build material support to move a distance at least the same as the width of the build platform 102, such that the band of deposited build material extends along the whole width of the build platform 102. This enables build material to be subsequently spread over the whole surface of the build platform 102.

In a further example, the controller 400 controls the build material support to move a distance that is less than the width of the build platform 102, such that the band of deposited build material extends only along a portion of the width of the build platform 102, This enables build material to be subsequently spread over a portion of the build platform 102. This may, for example, be useful when 3D printing objects using only a portion of the build platform, for example, when 3D printing small objects.

At 504, the controller 400 controls the recoater 108 to move over the build material support 106 and build platform 102 thereby spreading the band of build material deposited on the build material support 106 over the surface of the build platform 102 to form a layer of build material thereon. It will be appreciated that an initial layer of build material will be formed directly on the surface of the build platform, whereas subsequent layers of build material will be formed on previously formed layers of build material.

The controller 400 stops the recoater 108 when it is above the excess build material support 110, causing any excess build material to be left on the excess build material support 110.

At 506, the controller 400 controls the recoater 108 to move over the excess build material on the build material support 110 to the far side thereof, without moving the excess build material off the build material support 110. In one example this may achieved by raising the recoater by a suitable height above the height of the volume of excess build material, moving the recoater past the excess build material, and then lowering the recoater to its initial height. In another example this may be achieved by lowering the build material support by a suitable distance, moving the recoater beyond the excess build material, and then raising the build material support to its initial height. In other examples other appropriate mechanisms could be used.

At 508, the controller 400 controls the recoater 108 to spread any excess build material back over the build platform and to leave any excess build material on the build material support 106.

At 510, the controller 400 controls the build material support 106 to move in a reverse direction to return any excess build material thereon back to the hopper 104, as illustrated in FIG. 3*b*. In one example, before the build material support 106 is moved in the reverse direction the recoater 108 may be moved backwards a short distance so it is no longer over the build material support, thereby allowing any excess build material on the build material support to be returned unhindered to the hopper 104. As previously described, the shape of the hopper 104, and the hopper build material guides 210 enable excess build on the build material support 106 to be returned to the hopper 104 by moving the build material support towards the hopper 104. To ensure that all excess build material is returned to the hopper 104 the controller 400 controls the build material support 106 to move in the reverse direction for at least a distance equal to the distance it was initially moved in the first direction to initially deposit the band of build material thereon. In one example, an additional distance may be added, for example between about 5 and 20 cm of movement, to ensure that all excess build material is returned to the hopper.

At 512, the controller 400 controls the recoater 108 to move to its initial position as shown in FIG. 1, thereby completing a build material distribution cycle. Once a suitable selective solidification process has been performed on the layer of build material formed on the build platform 102, the controller 400 may repeat the operations 502 to 512 to form a further layer of build material.

In one example, the band of build material deposited of the build material support 106 by hopper 104 has a rectangular profile, where the height of the band is small compared to the width of the band. In one example, the height of the band may be in the region of about 1% to 10% of the width of the band, although in other examples other height to width ratios may be chosen. One reason for forming such a band is that some 3D printing systems use pre-heating systems (not shown), such as pre-heating lamps, to pre-heat build material prior to it being spread over the build platform 102. Having a wide band with a low height enables an efficient and rapid pre-heating of the band of build material formed on the build material support 106. Furthermore, performing pre-heating of build material outside of the hopper (i.e. on the build material support) may be useful when using build materials that become sticky or have modified flow properties when preheated. This enables build material within the hopper 104 to stay cool and minimizes any change in build material characteristics within the hopper 104.

By returning excess build material back to the hopper 104 at the end of the build material distribution cycle enables each build material distribution cycle to start from a known state. In this way, each cycle forms a known quantity of build material on the build material support 106 which helps increase the consistency and accuracy with which each layer of build material on the build platform 102 may be processed.

In one example; the build material support 106 may be heated; or may pass in close proximity to a build material support heater, for example, placed below the build material support 106, In this way, a band of build material formed on the build material support 106 may be pre-heated without use of overhead heating lamps.

It will be appreciated that examples described herein can be realized in the form of hardware, software or a combination of hardware and software, Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples may be conveyed electronically via any medium such as a communication signal carried over a wired or wireless connection.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of distributing a build material in a 3D printing system, comprising:
   moving, by a controller, a build material support in a first direction of a first axis, wherein the build material support is positioned below a hopper that stores the build material, the movement of the build material support in the first direction to cause the build material stored in the hopper to be deposited on the build material support;
   transferring, by the controller, the build material deposited on the build material support onto a build platform;
   moving, by the controller, a recoater to spread the build material on the build platform to form a layer of the build material on the build platform; and
   moving, by the controller, the build material support in a second direction opposite to the first direction to cause any excess build material on the build material support to be returned to the hopper.

2. The method of claim 1, wherein the build material support is moved a length corresponding to a width of the build platform to enable the layer of the build material to be formed over a whole surface of the build platform.

3. The method of claim 1, wherein the build material support is moved a length less than a width of the build platform to enable the layer of the build material to be formed over a portion of a surface of the build platform.

4. The method of claim 1, further comprising:
   moving the recoater to spread the build material on the build platform towards an excess build material support; and
   moving the recoater over an edge of the build platform to push any extra build material onto the excess build material support.

5. A three-dimensional (3D) printing system, comprising:
a hopper positioned above a build material support to deposit a build material on the build material support, the build material support positioned adjacent to a build platform and being moveable in a first axis;
a recoater to form a layer of the build material on the build platform using the build material deposited on the build material support; and
a controller to:
control the build material support to move in a first direction in the first axis to cause a band of build material to be distributed from the hopper on the build material support;
control to transfer the band of the build material from the build material support onto the build platform;
control the recoater to move over the build platform to form the layer of the build material on the build platform; and
control the build material support to move in a second direction opposite the first direction to cause any excess build material on the build material support to be returned to the hopper.

6. The 3D printing system of claim 5, wherein a base of the hopper forms a substantial seal with the build material support and defines a port through which the build material exits the hopper when the build material support is moved in the first direction away from the hopper, and through which the excess build material enters the hopper when the build material support is moved in the second direction towards the hopper.

7. The 3D printing system of claim 5, wherein the hopper is a choked-flow hopper for use with the build material.

8. The 3D printing system of claim 5, wherein the build material support is a continuous belt.

9. The 3D printing system of claim 5, wherein the controller controls the recoater to:
spread the build material on the build platform towards an excess build material support; and
move the recoater beyond an edge of the build platform to push any extra build material onto the excess build material support.

10. The 3D printing system of claim 9, wherein, to push the extra build material onto the excess build material support, the controller lowers the excess build material support, moves the recoater beyond the edge of the build platform to push the extra build material onto the excess build material support, and raises the excess build material support to its initial height.

11. The 3D printing system of claim 9, wherein, to push the extra build material onto the excess build material support, the controller raises an initial height of the recoater, moves the recoater beyond the edge of the build platform to push the extra build material onto the excess build material support, and returns the recoater to its initial height.

12. The 3D printing system of claim 5, wherein the build platform is:
an integral portion of the 3D printing system; or
part of a removably insertable 3D printing build module.

13. A build material distribution system for a 3D printer, comprising:
a hopper positioned above a build material support to deposit a build material on the build material support, the build material support positioned adjacent to a build platform and being moveable in a first axis;
a recoater to form a layer of the build material on the build platform using the build material deposited on the build material support; and
a controller to:
control the build material support to move in a first direction in the first axis to cause the build material to be distributed from the hopper on the build material support;
control to transfer the build material from the build material support onto the build platform;
control the recoater to move over the build platform to spread the build material on the build platform and push any extra build material onto an excess build material support; and
control the build material support to move in a second direction opposite the first direction to cause any excess build material on the build material support to be returned to the hopper.

* * * * *